UNITED STATES PATENT OFFICE 2,075,254

VULCANIZED HALOGEN CONTAINING RUBBER DERIVATIVES

Herbert A. Winkelmann, Chicago, Ill., assignor to Marbon Corporation, a corporation of Delaware No Drawing. Application May 20, 1935, Serial No. 22,431

14 Claims. (Cl. 260—1)

This application is a continuation in part of my copending application on "Stabilized butadiene derivatives", Serial No. 11,665, which describes but does not claim the preparation of a vulcanized butadiene hydrochloride.

The present invention relates to the heat treatment of butadiene hydrohalides or butadiene halides, and particularly to the heat treatment of such compounds with vulcanizing agents.

Butadiene derivatives such as rubber are unsaturated hydrocarbons and as such are capable of reacting additively with various substances which attach themselves at the double bonds of the butadiene molecule. Rubber, for example, is generally considered as a straight chain hydrocarbon having the empirical formula $(C_5H_8)_x$ and the following nuclear formula:

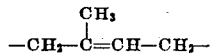

When rubber is saturated with hydrogen chloride the empirical form of material is apparently changed from $(C_5H_8)_x$ to $(C_5H_9Cl)_x$. It has been found that hydrogen halides may react additively to the rubber molecule to form either amorphous asymmetrical compounds or crystalline symmetrical compounds whose respective physical properties vary greatly. It is believed that the asymmetrical compound has the following formula:

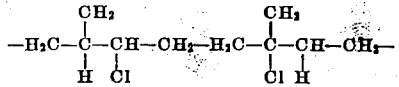

and that the symmetrical compound is as follows:

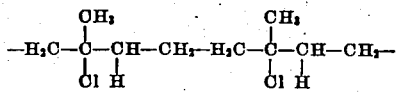

Rubber may also react with halogen by addition and also by substitution to give rubber halides having various chlorine contents. Rubber hydrohalides may also react with halogen to give halogenated rubber hydrohalides. Hydrohalogenated rubber halides may likewise be produced.

The theoretical maximum amount of chlorine which can add to the rubber molecule by the hydrogen chloride and rubber reaction is about 34%, although in practice, due to impurities in the rubber, about 32% is the highest attained. With chlorine the theoretical maximum by addition to the double bonds is about 51%, because of the ease with which substitution compounds are readily obtained having 60% chlorine.

The rubber hydrochloride produced by reacting hydrogen chloride and rubber at $-85°$ C. has a maximum chlorine content of about 29.9%, is amorphous and is believed to be the asymmetrical compound.

The rubber hydrochloride produced with hydrogen chloride rubber at room temperature has a maximum chlorine content of about 32%, and is believed to be the symmetrical compound. Rubber may be reacted in its solid or dissolved condition with halogen and hydrogen halides.

Both types of rubber hydrochloride may be made by partially instead of completely reacting rubber and hydrogen chloride.

Partially saturated rubber halides as well as rubber hydrohalides may be produced.

All rubber halides, rubber hydrohalides, halogenated rubber hydrohalides, hydrohalogenated rubber halides and halogen containing butadiene derivatives in general are thermoplastic. When molded they will stick to a hot mold. On the other hand vulcanized rubber is nonthermoplastic and may be removed from a hot mold.

It is an object of this invention to produce nonthermoplastic halogen-containing butadiene derivatives.

Another object of this invention is to produce new compositions and derivatives of rubber hydrohalides.

A further object is to produce a substitute for hard rubber.

Another object is to produce a material which is less expensive than polymerized chloroprene, but which has similar characteristics.

Other objects will become apparent from reading the specification.

In the present invention butadiene compounds such as rubber hydrochlorides are heated with a vulcanizing agent and preferably a vulcanizing accelerator in the presence of a stabilizer. A transformation takes place which is believed to be a vulcanization, although the exact nature and theory of the action is not definitely understood. Similar to the vulcanization of rubber, a skin formation first takes place and the action proceeds inwardly, thermoplasticity is lessened and a combination with sulfur, and it is believed with magnesium oxide, takes place, while the chlorine content does not substantially decrease. With small amounts of sulfur soft products are obtained and with large amounts of sulfur hard products are obtained.

The following examples will illustrate the invention:

Example I

The following formula is compounded by milling, and the resulting mixture is heated in a mold at 307° F. for twenty minutes:

| | Preferred |
|---|---|
| Asymmetrical amorphous rubber hydrochloride (28.7% chlorine) | 100 |
| Magnesium oxide | 15 |
| Lead oxide | 10 |
| Rosin | 8 |
| Phenyl beta naphthylamine | 2 |
| White substitute | 100 |
| Gastex (gas carbon black) | 100 |
| Butyraldehyde-aniline | 1 |
| Sulfur | 1 |

The resulting product may be readily removed from the hot mold. A transformation of some kind, which is believed to be a vulcanization, has taken place to a substantial extent.

Example II

The following formula is compounded by milling and the resulting mixture is heated in a mold for 20 minutes at 307° F.:

| | |
|---|---|
| Partially saturated crystalline rubber hydrochloride (29.6% chlorine) | 100 |
| Magnesium oxide | 10 |
| Lead oxide | 10 |
| Wood rosin | 10 |
| Symmetrical di-beta naphthyl-para phenylenediamine | 2 |
| Thermax (soft carbon black) | 115 |
| Butyl stearate | 5 |
| Butyraldehyde-aniline | 1 |
| Sulfur | 3 |

The resulting product may readily be removed from a hot mold. Its characteristics as compared with the products obtained at 240° F. and 260° F. are shown in the following tables:

Table A

| | Tensile | Elongation | Set |
|---|---|---|---|
| 2 minutes at 260° F | 3075 | 10 | |
| 30 minutes at 260° F | 2673 | 10 | |
| 20 minutes at 307° F | 310 | 420 | 55 |

The substitution of gastex, a gas carbon black, for thermax, increases the tensile strength. Table B shows the characteristics of the products made when this is done.

Table B

| | Tensile | Elongation | Set |
|---|---|---|---|
| 2 minutes at 260° F | 3860 | 10 | |
| 30 minutes at 260° F | 3670 | 10 | |
| 20 minutes at 260° F | 673 | 110 | 13 |

Example III

The following formulae are mixed by milling and the mixture heated in a mold at 307° F. for ninety minutes:

| | #1 | #2 | #3 | #4 |
|---|---|---|---|---|
| Crystalline rubber hydrochloride (29.6% chlorine) (partially reacted) | 100 | 100 | 100 | 100 |
| Magnesium oxide | 10 | 10 | 15 | |
| Lead oxide | 10 | 10 | | 20 |
| Wood rosin | 5 | | | |
| Butyraldehyde-aniline | 2 | 2 | 2 | 2 |
| Sulfur | 3 | 3 | 3 | 3 |

The resulting products are readily removed from a hot mold and otherwise show that they are cured or vulcanized. The products are light brown in color. The products obtained by heating at 307° F. for ten minutes are cured sufficiently to be removed from a hot mold but the magnesium oxide product is black in color. The product obtained by heating without the magnesium oxide is badly blown.

Example IV

The following formula is mixed by milling, and the mixture heated in a mold at 307° F. for ninety minutes:

| | #1 | #2 |
|---|---|---|
| Crystalline rubber hydrochloride (31% chlorine) | 100 | 100 |
| Magnesium oxide | 10 | 10 |
| Lead oxide | 10 | 10 |
| Wood rosin | 5 | |
| Butyraldehyde-aniline | 2 | 2 |
| Sulfur | 3 | 3 |

The resulting products are readily removed from a hot mold and otherwise show that they are cured or vulcanized. They are flexible, soft and light brown in color. The product obtained by heating one of the mixtures for twenty minutes at 307° is also cured sufficiently to be removed from a hot mold, but it is black in color. The product obtained by heating for 60 minutes at 307° F. is light brown, well cured, but not as much as that produced by longer heating.

Example V

The following formula is mixed by milling, and the mixture heated in a mold at 307° F. for 90 minutes:

| | |
|---|---|
| Amorphous asymmetrical rubber hydrochloride (28.7% chlorine) | 100 |
| Magnesium oxide | 10 |
| Lead oxide | 10 |
| Wood rosin | 5 |
| Butyraldehyde-aniline | 2 |
| Sulfur | 3 |

A soft flexible light brown cured product is obtained. The product obtained by heating at 307° F. for twenty minutes is lighter in color and only superficially cured, being removable from a hot mold with difficulty. The product obtained by heating for 30 minutes at 260° F. is white in color, removable from a hot mold, and stiffer than the product obtained by heating at 307° F. With lead oxide in place of magnesium oxide, darker colored products are obtained.

Example VI

The following formula is mixed by milling and the mixture heated in a mold at 307° F. for ninety minutes:

| | |
|---|---|
| Crystalline rubber hydrochloride (29.6% chlorine) (partially reacted) | 100 |
| Magnesium oxide | 10 |
| Lead oxide | 10 |
| Wood rosin | 5 |
| Mercapto benzothiozole | 2 |
| Stearic acid | 2 |

The product produced is light brown in color, cured, but is of light apparent density and blows from the mold. The products obtained by heating for shorter time intervals are lighter in color and less cured. For more practical purposes the product obtained in the same length of time with the butyraldehyde accelerator is better, as shown in Example IV.

Example VII

The following formula is compounded by milling, and heated for twenty, forty, eighty minutes in a mold:

| | |
|---|---|
| Rubber hydrochloride | 50 |
| Polymerized chloroprene | 50 |
| Wood rosin | 5 |
| Magnesium oxide | 10 |
| Lead oxide | 10 |
| Phenyl-beta naphthylamine | 2 |
| Amyl amine | 1 |
| Sulfur | 1 |

The product obtained has characteristics as follows:

| | Tensile | Elongation | Set |
|---|---|---|---|
| 20 minutes at 307° F | 1740 | 590 | 22 |
| 40 minutes at 307° F | 1190 | 560 | 25 |
| 80 minutes at 307° F | 955 | 460 | 20 |

In place of polymerized chloroprene other materials may be mixed with the rubber hydrochloride and cured or vulcanized. Among these are crude rubber, reclaimed rubber, reclaimed-rubber hydrochloride, scrap rubber, scrap rubber hydrochloride. Mixtures of rubber hydrochloride and reclaimed-rubber hydrochloride in about equal proportions are particularly suitable and advantageous. The proportion of sulfur may be varied widely, resulting in harder types of products as the amount of sulfur is increased.

Example VIII

The following example shows the effect of increasing the sulfur content. The materials were compounded by milling and heated at 307° F. for two hours:

| | #1 | #2 |
|---|---|---|
| Rubber hydrochloride (29.6% chlorine) | | 100 |
| Rubber hydrochloride (28.7% chlorine) | 100 | |
| Magnesium oxide | 10 | 10 |
| Lead oxide | 10 | 10 |
| Wood rosin | 5 | 5 |
| Butyraldehyde-aniline | 2 | 2 |
| Sulfur | 40 | 40 |

A hard light colored product is obtained, which is readily removable from a hot mold. The material is similar to hard rubber but it is lighter in color. Elimination of lead oxide and increasing the amount of magnesium oxide gives an even lighter product. The product is apparently highly vulcanized rubber hydrochloride, containing combined sulfur, and having approximately the same chlorine content as the initial product. The amount of sulfur required to produce the hard type of product may be as low as about 10%. By pigmenting with white pigments such a titanium oxide there may be obtained practically white compositions which may have greater utility than the darker corresponding hard rubber compositions.

The essential materials for the production of the preferred product which is removable from a hot mold without blowing are rubber hydrochloride, a stabilizer such as magnesium oxide, lead oxide, a vulcanizing agent such as sulfur, an accelerator such as butyraldehyde-aniline. Some curing or vulcanizing takes place when a rubber hydrohalide or a rubber halide is heated with sulfur alone or in the presence of any stabilizer such as described in my copending application, Serial No. 11,665, but the stabilizing mixture of magnesium oxide and litharge gives superior results, probably due to the fact that they may function as accelerators and vulcanizing agents as well as stabilizers. However, an organic accelerator is for practical purposes essential. Butyraldehyde-aniline, hexamethylene tetramine, nitroso compounds, diphenyl guanidine, tetramethyl thiuram disulfide, tetramethyl thiuram monosulfide, mercaptobenzothiazole (captax), mercaptobenzothiazole disulfide, piperidine pentamethylene dithio carbamate, zinc dimethyldithio carbamate, triphenyl guanidine, diphenyl guanidine oxalate or phthalate, thiocarbamilide, diortho tolyl thiourea, para nitrosyl dimethyl aniline, zinc thio phenole, zinc di thio benzoate, heptaldehyde aniline may be used, as well as other accelerators for rubber and particularly the aldehyde-amine accelerators. Rosin also aids in the curing and is a preferred ingredient. The use of a large proportion of inert material such as gastex is of aid in obtaining a product which is sufficiently non-thermoplastic that it can be removed from a hot mold.

The present invention covers broadly the partial or complete transformation of butadiene hydrohalides or butadiene halides into products of lesser thermoplasticity, whether such transformation is in fact a vulcanization or some other action.

The details given in the examples may be varied widely. For the production of the preferred product, which is removable from a hot mold, the minimum amounts of sulfur, filler, and stabilizer will vary, as will also the temperature and time of curing, depending on the type of rubber hydrohalide, rubber halide, the degree of saturation of the compound, the type of accelerator used, but such variations are within the principle of this invention. The preferred butadiene compound is a rubber hydrochloride which has some of its double bonds available for further reaction. The asymmetrical rubber hydrochloride acts slightly differently than the symmetrical rubber hydrochloride, but all types are operable. The asymmetrical rubber hydrochlorides used in the example which contains 28.7% chlorine is a substantially completely reacted product made by reacting solid rubber with liquefied hydrogen chloride at about −85° C.; the crystalline rubber hydrochloride of 29.7% chlorine is a partially reacted product produced by incompletely reacting hydrogen chloride and rubber in solution at normal temperatures; the crystalline rubber hydrochloride having 31% chlorine is obtained by completely reacting hydrogen chloride with rubber in solution at normal temperatures. The rubber hydrochloride may be made from scrap rubber, reclaimed rubber, or other partially vulcanized rubber. Balata and gutta percha hydrochlorides may be used. In general, halogen containing butadiene compounds are operable, but the preferred results are obtained with butadiene hydrohalides. Where stabilizers are present and for practical purposes the use of stabilizers and particularly magnesium oxide is of prime importance, the reaction with sulfur proceeds with little, if any loss of chlorine. The stabilizer such as magnesium oxide, is also of advantage in mixing the ingredients by milling as without it extensive scorching and decomposition takes place. However, the invention is not limited to the use of stabilizers and sulfur, but covers broadly the heat treatment and reaction of butadiene hydrohalides and butadiene halides with vulcanizing agents, and particularly sulfur, selenium, tellurium, although the reaction with magnesium oxide is not precluded.

The heat treatment may be carried out by heating a milled sheet of about ¼" in a mold under pressure to produce a cured molded sheet of about 1/16" thickness. Cured sheets of various thicknesses having many uses may be thus produced, as for example sheets of .001" thickness suitable for wrapping purposes. It is also not necessary that the curing be carried out in a molding apparatus, although such is the preferred method of keeping the masses in shape during the transformations taking place throughout the heat treatment.

I claim:

1. A composition comprising the reaction product of rubber hydrochloride, polymerized chloroprene and sulfur.

2. The method of producing a substantially non-thermoplastic rubber hydrochloride composition which comprises heating a mixture of rubber hydrochloride, sulfur, accelerator and stabilizer.

3. The method of making a hard rubber substitute which comprises heating rubber hydrochloride in the presence of a large proportion of sulfur.

4. The method which comprises molding a mixture of rubber hydrochloride, and sulfur under the influence of heat.

5. The method which comprises reacting a rubber hydrohalides with sulfur under the influence of heat.

6. The method which comprises heating a rubber hydrochloride and sulfur under the influence of sufficient heat and for a sufficient time to produce a transformation from a thermoplastic composition to a relatively non-thermoplastic composition.

7. The method which comprises heating a rubber hydrochloride, sulfur and accelerator under the influence of sufficient heat and for a sufficient time to produce a transformation from a thermoplastic composition to a relatively non-thermoplastic composition.

8. The method which comprises heating a rubber hydrochloride, sulfur and a basic material under the influence of sufficient heat and for a sufficient time to produce a transformation from a thermoplastic composition to a relatively non-thermoplastic composition.

9. The method which comprises heating a rubber hydrochloride with a vulcanizing agent, a vulcanization accelerator, and a basic stabilizer under the influence of sufficient heat and for sufficient time to produce a transformation from a thermoplastic composition to a relatively non-thermoplastic composition.

10. The method which comprises heating a mixture of a rubber hydrochloride, magnesium oxide, sulfur, and accelerator under the influence of sufficient heat and for a sufficient time to produce a transformation from a thermoplastic composition to a relatively non-thermoplastic composition.

11. The method which comprises heating a mixture of a rubber hydrochloride, polymerized chloroprene and a vulcanizing agent under the influence of sufficient heat and for sufficient time to produce a transformation from a thermoplastic composition to a relatively non-thermoplastic composition.

12. The method of making a soft, elastic, relatively non-thermoplastic composition which comprises heating a mixture consisting of substantially saturated rubber hydrochloride approximately 100 parts by weight, magnesium oxide approximately 10 parts by weight, lead oxide approximately 10 parts by weight, butyr aldehyde-aniline approximately 2 parts by weight, and sulfur approximately 3 parts by weight, at a temperature of approximately 307° F. for approximately 90 minutes.

13. The product obtained in accordance with the process defined in claim 10.

14. The product obtained in accordance with the process defined in claim 5.

HERBERT A. WINKELMANN.